(12) United States Patent
Suzuki

(10) Patent No.: US 8,380,235 B2
(45) Date of Patent: Feb. 19, 2013

(54) COMMUNICATION SYSTEM, MANAGEMENT APPARATUS, MANAGEMENT METHOD AND PROGRAM

(75) Inventor: Takehiro Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 256 days.

(21) Appl. No.: 12/935,033

(22) PCT Filed: Mar. 26, 2009

(86) PCT No.: PCT/JP2009/056149
§ 371 (c)(1),
(2), (4) Date: Sep. 28, 2010

(87) PCT Pub. No.: WO2009/125679
PCT Pub. Date: Oct. 15, 2009

(65) Prior Publication Data
US 2011/0028174 A1    Feb. 3, 2011

(30) Foreign Application Priority Data
Apr. 11, 2008    (JP) .................. 2008-103551

(51) Int. Cl.
*H04Q 7/20* (2006.01)
(52) U.S. Cl. ............ 455/509; 455/507; 455/414.1; 455/508; 455/422.1; 455/403; 370/242; 370/244; 370/245; 370/328; 370/345

(58) Field of Classification Search .............. 455/509, 455/507, 508, 500, 517, 445, 414.1–414.4, 455/550.1, 67.11, 515, 422.1, 403; 370/242, 370/244, 245, 328, 329.345
See application file for complete search history.

(56) References Cited

U.S. PATENT DOCUMENTS
2011/0261680 A1 * 10/2011 Boudreaux et al. ........... 370/217

FOREIGN PATENT DOCUMENTS
JP    2008508795 A    3/2008
WO    2008038384 A    4/2008

OTHER PUBLICATIONS
International Search Report for PCT/JP2009/056149 mailed Jun. 9, 2009.
WiMAX Forum Network Architecture (Stage 3: Detailed Protocols and Procedures), Release1.1.1, WiMAX Forum Proprietary, Sep. 14, 2007.

* cited by examiner

*Primary Examiner* — Keith Ferguson

(57) ABSTRACT

When a service providing device which provides a service to a mobile communication terminal has entered a service stop state, a managing device connected to the service providing device instructs service providing devices other than the service providing device which has entered the service stop state, to release a resource of a mobile communication terminal to which a service has been provided by the service providing device which has entered the service stop state.

11 Claims, 16 Drawing Sheets

Fig.3

| MS identification information | Anchor ASN-GW identification information | Serving ASN-GW identification information | Authenticator ASN-GW identification information |
|---|---|---|---|
| MS 401-1 | ASN-GW 201-1 | ASN-GW 201-2 | ASN-GW 201-3 |
| MS 401-2 | ASN-GW 201-1 | ASN-GW 201-1 | ASN-GW 201-1 |
| MS 401-3 | ASN-GW 201-1 | ASN-GW 201-2 | ASN-GW 201-2 |

Fig.4

| MS identification information | Anchor ASN-GW identification information | Serving ASN-GW identification information | Autheticator ASN-GW identification information |
|---|---|---|---|
| MS 401-1 | ASN-GW 201-1 | ASN-GW 201-2 | ASN-GW 201-3 |
| MS 401-3 | ASN-GW 201-1 | ASN-GW 201-2 | ASN-GW 201-2 |

Fig.5

| MS identification information | Anchor ASN-GW identification information | Serving ASN-GW identification information | Autheticator ASN-GW identification information |
|---|---|---|---|
| MS 401-1 | ASN-GW 201-1 | ASN-GW 201-2 | ASN-GW 201-3 |

Fig.7

| MS identification information | Anchor ASN-GW identification information | Serving ASN-GW identification information | Autheticator ASN-GW identification information |
|---|---|---|---|
| MS 401-1 | ASN-GW 201-1 | ASN-GW 201-2 | ASN-GW 201-3 |
| MS 401-2 | ASN-GW 201-1 | ASN-GW 201-1 | ASN-GW 201-1 |
| MS 401-3 | ASN-GW 201-1 | ASN-GW 201-2 | ASN-GW 201-2 |
| ⋮ | ⋮ | ⋮ | ⋮ |

COMMUNICATION SYSTEM, MANAGEMENT APPARATUS, MANAGEMENT METHOD AND PROGRAM

This application is the National Phase of PCT/JP2009/056149, filed Mar. 26, 2009 which claims the benefit of priority from Japanese Patent Application No. 2008-103551, filed on Apr. 11, 2008, the entire contents of which are incorporated herein by reference.

TECHNICAL FIELD

The present invention relates to a communication system, a management apparatus, a management method and a program which provide a plurality of services to a mobile terminal.

BACKGROUND ART

A mobile WiMAX system that applies WiMAX (Worldwide Interoperability for Microwave Access) technology, a recent focus of attention, to mobile communication involves an ASN-GW (Access Service Network Gateway) that is a service providing apparatus for providing services to an MS (Mobile Station) via a BS (Base Station). The ASN-GW is disclosed in Document "WiMAX Forum Network Architecture—Stage 3—Detailed Protocols and Procedures—Release 1.1.1, Sep. 14, 2007" for example. The ASN-GW is provided with three logical functions, namely, a Serving function for managing information of the MS, an Anchor function which serves as a data path enabling the MS to communicate, and an Authenticator function for performing authentication processing of the MS. These functions are to be executed by an ASN-GW connected to a BS to which an MS has entered.

However, there are cases in which a movement of the MS causes the three logical functions described above to be physically distributed over a plurality of ASN-GWs. For example, there are cases where a movement of the MS causes the three logical functions to be distributed over a plurality of ASN-GWs after a handover across a plurality of ASN-GWs (R4 HO: Reference-Point 4 Handover) is performed or after reauthentication subsequent to R4 HO is performed.

As an example, a case will now be cited where the three logical functions with respect to an arbitrary MS (hereinafter referred to as an MSA) are physically distributed across three ASN-GWs (an ASN-GW1 to perform the Serving function, an ASN-GW2 to perform the Authenticator function, and an ASN-GW3 to perform the Anchor function).

In such a circumstance, for example, when the ASN-GW1 enters a service suspended state, services can no longer be provided to the MSA as a WiMAX network. However, the ASN-GW2 and the ASN-GW3 are unable to detect that the ASN-GW1 has fallen into a service suspended state and, accordingly, are equally unable to detect that services can no longer be provided to the MSA. Therefore, regardless of the fact that services can no longer be provided to the MSA as a WiMAX network, the ASN-GW2 and the ASN-GW3 continue to manage information of the MSA. This causes a problem in that resources end up being secured uselessly.

DISCLOSURE OF THE INVENTION

An object of the present invention is to provide a communication system, a management apparatus, a management method and a program which solve the problem described above.

In order to achieve the object described above, in a communication system comprising a plurality of service providing apparatuses providing a plurality of services via a wireless base station to a mobile communication terminal provided with a wireless communication function and a management apparatus connected to the plurality of service providing apparatuses, the management apparatus detects whether or not any of the plurality of service providing apparatuses are in a service suspended state, and instructs service providing apparatuses other than a service providing apparatus having entered the service suspended state to release resources of the mobile communication terminal to which services have been provided by the service providing apparatus having entered the service suspended state.

In addition, a management apparatus that manages a plurality of service providing apparatuses providing a plurality of services via a wireless base station to a mobile communication terminal provided with a wireless communication function, wherein the management apparatus detects whether or not any of the plurality of service providing apparatuses are in a service suspended state, and instructs service providing apparatuses other than a service providing apparatus having entered the service suspended state to release resources of the mobile communication terminal to which services have been provided by the service providing apparatus having entered the service suspended state.

Furthermore, a management method for managing a plurality of service providing apparatuses providing a plurality of services via a wireless base station to a mobile communication terminal provided with a wireless communication function, the management method comprising steps for:

detecting whether or not any of the plurality of service providing apparatuses are in a service suspended state; and instructing service providing apparatuses other than a service providing apparatus having entered the service suspended state to release resources of the mobile communication terminal to which services have been provided by the service providing apparatus having entered the service suspended state.

Moreover, a program that causes a management apparatus that manages a plurality of service providing apparatuses providing a plurality of services via a wireless base station to a mobile communication terminal provided with a wireless communication function to execute procedures for:

detecting whether or not any of the plurality of service providing apparatuses are in a service suspended state; and instructing service providing apparatuses other than a service providing apparatus having entered the service suspended state to release resources of the mobile communication terminal to which services have been provided by the service providing apparatus having entered the service suspended state.

As described above, by configuring the present invention so as to detect whether or not any of service providing apparatuses providing services to a mobile communication terminal are in a service suspended state, and to instruct service providing apparatuses other than a service providing apparatus having entered the service suspended state to release resources of the mobile communication terminal to which services have been provided by the service providing apparatus having entered the service suspended state, the risk of resource depletion can be reduced.

BRIEF DESCRIPTION OF THE DRAWINGS

FIG. 3 is a diagram showing an example of MS management information stored in a management table of the ASN-GW shown in FIG. 1;

FIG. 4 is a diagram showing an example of MS management information stored in a management table of the ASN-GW shown in FIG. 1;

FIG. 5 is a diagram showing an example of MS management information stored in a management table of the ASN-GW shown in FIG. 1;

FIG. 7 is a diagram showing an example of processing association information stored in a management table shown in FIG. 6;

BEST MODE FOR CARRYING OUT THE INVENTION

An exemplary embodiment of the present invention will now be described with reference to the drawings.

Figure 1:
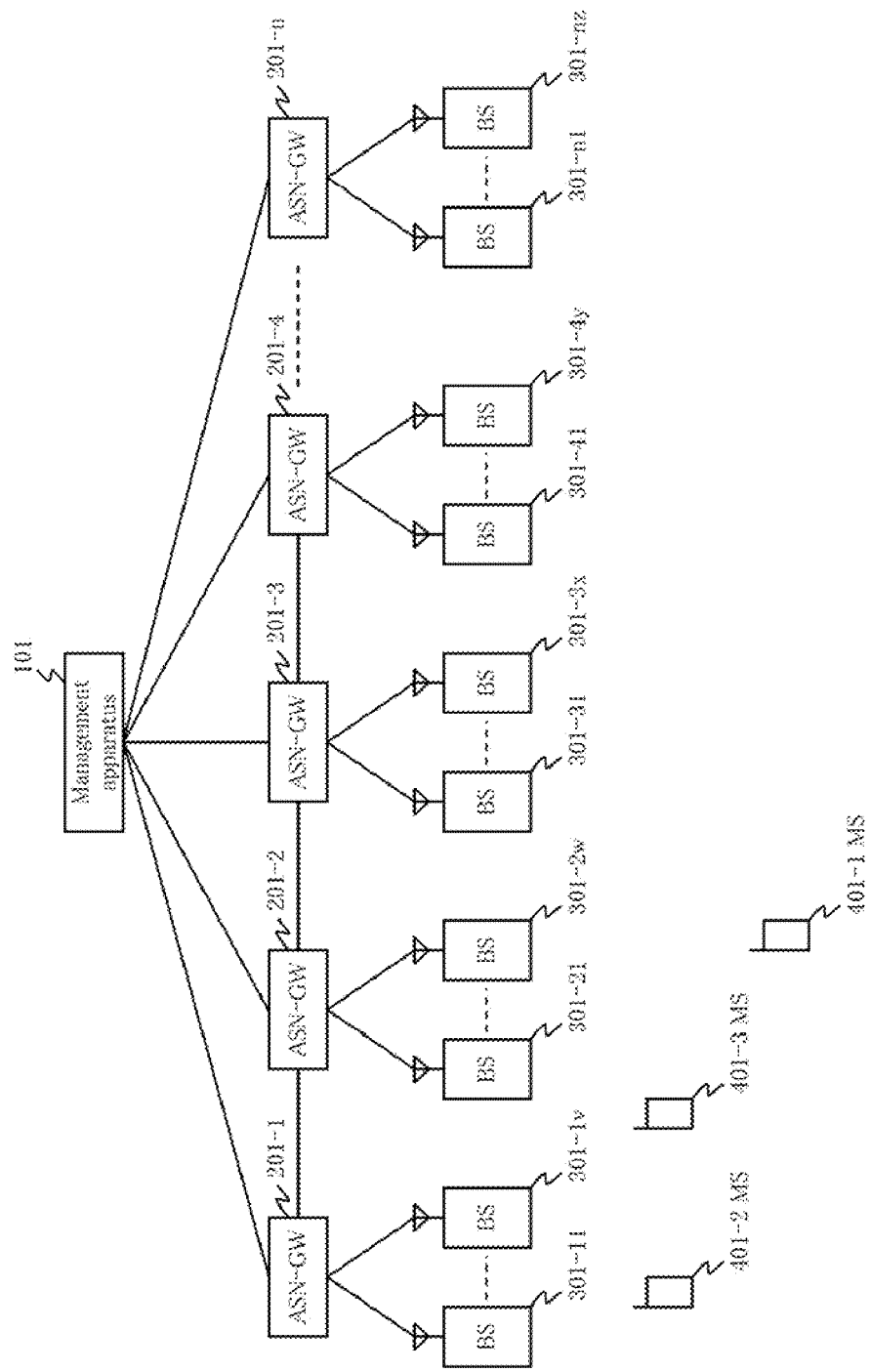
FIG. 1 is a diagram showing an exemplary embodiment of a communication system according to the present invention.

FIG. 1 is a diagram showing an exemplary embodiment of a communication system according to the present invention.

As shown in FIG. 1, the present exemplary embodiment includes: management apparatus 101; ASN-GWs 201-1 to 201-$n$; BSs 301-11 to 301-1$v$; BSs 301-21 to 301-2$w$; BSs 301-31 to 301-3$x$; BSs 301-41 to 301-4$y$; and BSs 301-$n$1 to 301-$nz$, where n, v, w, x, y and z denote any integers and, in particular, where n denotes any integer equal to or greater than 2. In addition, there exist mobile communication terminals MSs 401-1 to 401-3 provided with wireless communication functions. While FIG. 1 shows a case where there are three MSs 401-1 to 401-3, the numbers thereof are not limited to three.

Management apparatus 101 is connected to and manages ASN-GWs 201-1 to 201-$n$.

ASN-GWs 201-1 to 201-$n$ are service providing apparatuses provided on a WiMAX network which performs processing on MSs 401-1 to 401-3 via BSs 301-11 to 301-1$v$, BSs 301-21 to 301-2$w$, BSs 301-31 to 301-3$x$, BSs 301-41 to 301-4$y$, and BSs 301-$n$1 to 301-$nz$.

BSs 301-11 to 301-1$v$ are base stations connected to ASN-GW 201-1.

BSs 301-21 to 301-2$w$ are base stations connected to ASN-GW 201-2.

BSs 301-31 to 301-3$x$ are base stations connected to ASN-GW 201-3.

BSs 301-41 to 301-4$y$ are base stations connected to ASN-GW 201-4.

BSs 301-$n$1 to 301-$nz$ are base stations connected to ASN-GW 201-$n$.

An internal configuration of ASN-GWs 201-1 to 201-$n$ shown in FIG. 1 will now be described.

Figure 2:
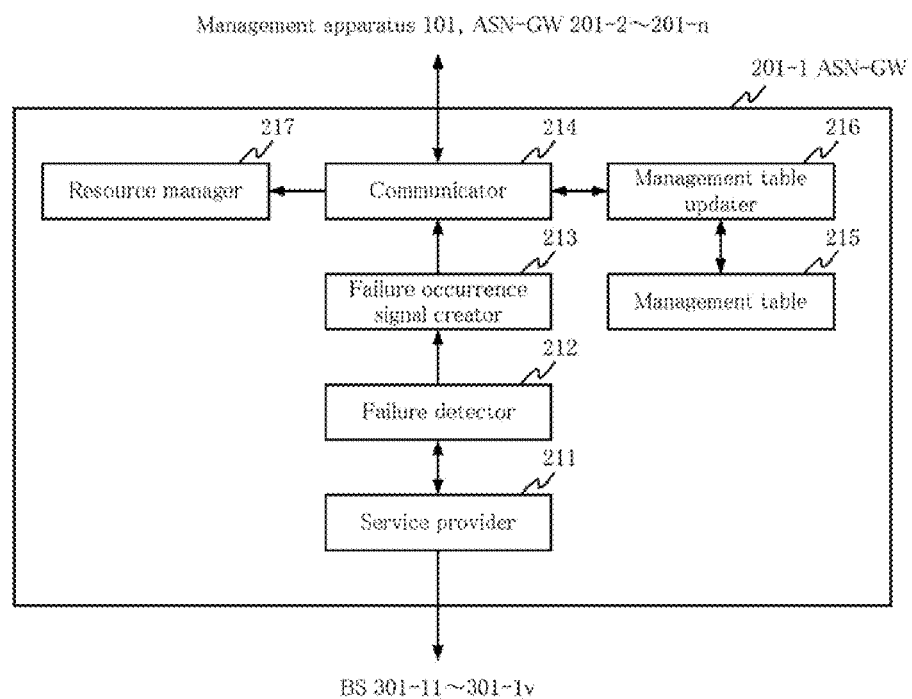
FIG. 2 is a diagram showing an example of an internal configuration of an ASN-GW shown in FIG. 1.

FIG. 2 is a diagram showing an example of an internal configuration of ASN-GW 201-1 shown in FIG. 1.

As shown in FIG. 2, ASN-GW 201-1 shown in FIG. 1 includes service provider 211, failure detector 212, failure occurrence signal creator 213, communicator 214, management table 215, management table updater 216, and resource manager 217.

Service provider 211 provides predetermined services to MSs 401-1 to 401-3 via BSs 301-11 to 301-1$v$. Services (functions) provided in this case are an Anchor function which serves as a data path enabling the MSs 401-1 to 401-3 to communicate, a Serving function for managing information of the MSs 401-1 to 401-3, and an Authenticator function for performing authentication processing of the MSs 401-1 to 401-3.

Failure detector 212 detects an occurrence of a failure in which service provider 211 is unable to provide services. As for a detection method thereof, a generally used failure detection method may suffice. Otherwise, the detection method may involve detecting whether or not a signal to be transmitted by service provider 211 to MSs 401-1 to 401-3 via BSs 301-11 to 301-1$v$ has been transmitted. Alternatively, the detection method may involve monitoring processes executed by service provider 211 and detecting that at least one of the processes is being suspended. Upon detecting an occurrence of a failure at service provider 211 or, in other words, upon detecting that the provision of services from service provider 211 has been suspended, failure detector 212 notifies failure occurrence signal creator 213 accordingly.

When notified by failure detector 212 that a failure has occurred at service provider 211 or, in other words, when notified by failure detector 212 that service provider 211 has entered a service suspended state, failure occurrence signal creator 213 creates a failure occurrence signal. The failure occurrence signal need only be recognizable by management apparatus 101, and a specific signal format thereof will not be stipulated herein. The failure occurrence signal includes ASN-GW identification information uniquely attached so as to be capable of identifying ASN-GW 201-1. Upon creating the failure occurrence signal, failure occurrence signal creator 213 outputs the created failure occurrence signal to communicator 214.

Communicator 214 is a second communicator which performs communication to management apparatus 101 and ASN-GWs 201-2 to 201-$n$. Communicator 214 transmits the failure incident signal outputted from failure occurrence signal creator 213 to management apparatus 101. In addition, communicator 214 transmits MS management information stored in management table 215 at a preset timing to management apparatus 101 via management table updater 216. Furthermore, when MS management information stored in management table 215 is updated due to a mobility operation of the MSs 401-1 to 401-3, communicator 214 transmits the MS management information to ASN-GWs 201-2 to 201-*n*. Moreover, communicator 214 outputs MS management information transmitted from ASN-GWs 201-2 to 201-*n* to management table updater 216.

Management table 215 stores MS management information for managing MSs to which ASN-GW 201-1 provides services (MSs managed under ASN-GW 201-1 or MSs for which ASN-GW 201-1 secures resources). In this case, resource refers to a memory area necessary to perform a given process. Resource also refers to a processing area of a CPU.

FIG. 3 is a diagram showing an example of MS management information stored in management table 215 of ASN-GW 201-1 shown in FIG. 1.

As shown in FIG. 3, management table 215 of ASN-GW 201-1 shown in FIG. 1 stores, in association with each other, identification information of MSs to which ASN-GW 201-1 provides services (MSs managed under ASN-GW 201-1), identification information of Anchor ASN-GWs performing the Anchor function which serves as a data path enabling the MSs to communicate, identification information of Serving ASN-GWs performing the Serving function for managing information of the MSs, and identification information of Authenticator ASN-GWs performing the Authenticator function for authenticating the MSs. Among functions shown in FIG. 3, the portion enclosed in the bold line are the functions currently being provided by ASN-GW 201-1.

For example, MS identification information MS 401-1, Anchor ASN-GW identification information ASN-GW 201-1, Serving ASN-GW identification information ASN-GW 201-2, and Authenticator ASN-GW identification information ASN-GW 201-3 are stored in association with each other. This indicates that with respect to MS 401-1, ASN-GW 201-1 performs the Anchor function, ASN-GW 201-2 performs the Serving function, and ASN-GW 201-3 performs the Authenticator function. In addition, MS identification information MS 401-2, Anchor ASN-GW identification information ASN-GW 201-1, Serving ASN-GW identification information ASN-GW 201-1, and Authenticator ASN-GW identification information ASN-GW 201-1 are stored in association with each other. This indicates that with respect to MS 401-2, ASN-GW 201-1 performs the Anchor function, the Serving function and the Authenticator function. Furthermore, MS identification information MS 401-3, Anchor ASN-GW identification information ASN-GW 201-1, Serving ASN-GW identification information ASN-GW 201-2, and Authenticator ASN-GW identification information ASN-GW 201-2 are stored in association with each other. This indicates that with respect to MS 401-3, ASN-GW 201-1 performs the Anchor function while ASN-GW 201-2 performs the Serving function and the Authenticator function.

The MS management information enables ASN-GW 201-1 to recognize (manage) which ASN-GWs 202-2 to 202-*n* are providing functions not provided by ASN-GW 201-1 with respect to MSs to which ASN-GW 201-1 provides services (MSs under management of ASN-GW 201-1) (in FIG. 3, MSs 401-1 to 401-3).

FIG. 4 is a diagram showing an example of MS management information stored in management table 215 of ASN-GW 201-2 shown in FIG. 1.

As shown in FIG. 4, management table 215 of ASN-GW 201-2 shown in FIG. 1 stores, in association with each other, identification information of MSs to which ASN-GW 201-2 provides services (MSs managed under ASN-GW 201-2), identification information of Anchor ASN-GWs performing the Anchor function which serves as a data path enabling the MSs to communicate, identification information of Serving ASN-GWs performing the Serving function for managing information of the MSs, and identification information of Authenticator ASN-GWs performing the Authenticator function for authenticating the MSs. Among functions shown in FIG. 4, the portion enclosed in the bold line are the functions currently being provided by ASN-GW 201-2.

For example, MS identification information MS 401-1, Anchor ASN-GW identification information ASN-GW 201-1, Serving ASN-GW identification information ASN-GW 201-2, and Authenticator ASN-GW identification information ASN-GW 201-3 are stored in association with each other. This indicates that with respect to MS 401-1, ASN-GW 201-1 performs the Anchor function, ASN-GW 201-2 performs the Serving function, and ASN-GW 201-3 performs the Authenticator function. In addition, MS identification information MS 401-3, Anchor ASN-GW identification information ASN-GW 201-1, Serving ASN-GW identification information ASN-GW 201-2, and Authenticator ASN-GW identification information ASN-GW 201-2 are stored in association with each other. This indicates that with respect to MS 401-3, ASN-GW 201-1 performs the Anchor function while ASN-GW 201-2 performs the Serving function and the Authenticator function.

The MS management information enables ASN-GW 201-2 to recognize (manage) which ASN-GWs 201-1, 202-3 to 202-*n* are providing functions not provided by ASN-GW 201-2 with respect to MSs to which ASN-GW 201-2 provides services (MSs under management of ASN-GW 201-2) (in FIG. 4, MSs 401-1 and 401-3).

FIG. 5 is a diagram showing an example of MS management information stored in management table 215 of ASN-GW 201-3 shown in FIG. 1.

As shown in FIG. 5, management table 215 of ASN-GW 201-3 shown in FIG. 1 stores, in association with each other, identification information of an MS to which ASN-GW 201-3 provides services (an MS managed under ASN-GW 201-3), identification information of an Anchor ASN-GW performing the Anchor function which serves as a data path enabling the MS to communicate, identification information of a Serving ASN-GW performing the Serving function for managing information of the MS, and identification information of an Authenticator ASN-GW performing the Authenticator function for authenticating the MS. Among functions shown in FIG. 5, the portion enclosed in the bold line is the function currently being provided by ASN-GW 201-3.

For example, MS identification information MS 401-1, Anchor ASN-GW identification information ASN-GW 201-1, Serving ASN-GW identification information ASN-GW 201-2, and Authenticator ASN-GW identification information ASN-GW 201-3 are stored in association with each other. This indicates that with respect to MS 401-1, ASN-GW 201-1 performs the Anchor function, ASN-GW 201-2 performs the Serving function, and ASN-GW 201-3 performs the Authenticator function.

The MS management information enables ASN-GW 201-3 to recognize (manage) which ASN-GWs 201-1, 201-2, 202-4 to 202-*n* are providing functions not provided by ASN-GW 201-3 with respect to an MS to which ASN-GW 201-3 provides services (the MS under management of ASN-GW 201-3) (in FIG. 5, MS 401-1).

The MS management information shown in FIGS. 3 to 5 is to be mutually notified among ASN-GWs 201-1 to 201-*n* at a preset timing when the functions (roles) respectively performed by ASN-GWs 201-1 to 201-*n* change, such as after a handover (R4 HO) across different ASN-GWs is performed by MSs 401-1 to 401-3 or after reauthentication subsequent to an R4 HO is performed.

Management table updater 216 updates, as necessary, MS management information stored in management table 215. For example, when MS management information is transmitted from ASN-GWs 201-2 to 201-*n* via communicator 214, management table 215 is updated based on the transmitted MS management information. In addition, management table 215 is updated when functions provided to MSs 401-1 to 401-3 change due to a mobility operation of MSs 401-1 to 401-3. Furthermore, when necessary, management table updater 216 reads MS management information stored in management table 215 and transmits the same to management apparatus 101 via communicator 214.

Resource manager 217 manages resources of MSs 401-1 to 401-3 to which ASN-GW 201-1 provides services.

The internal configurations of ASN-GWs 202-2 to 201-*n* shown in FIG. 1 are the same as the internal configuration of ASN-GW 201-1 described above.

An internal configuration of management apparatus 101 shown in FIG. 1 will now be described.

Figure 6:
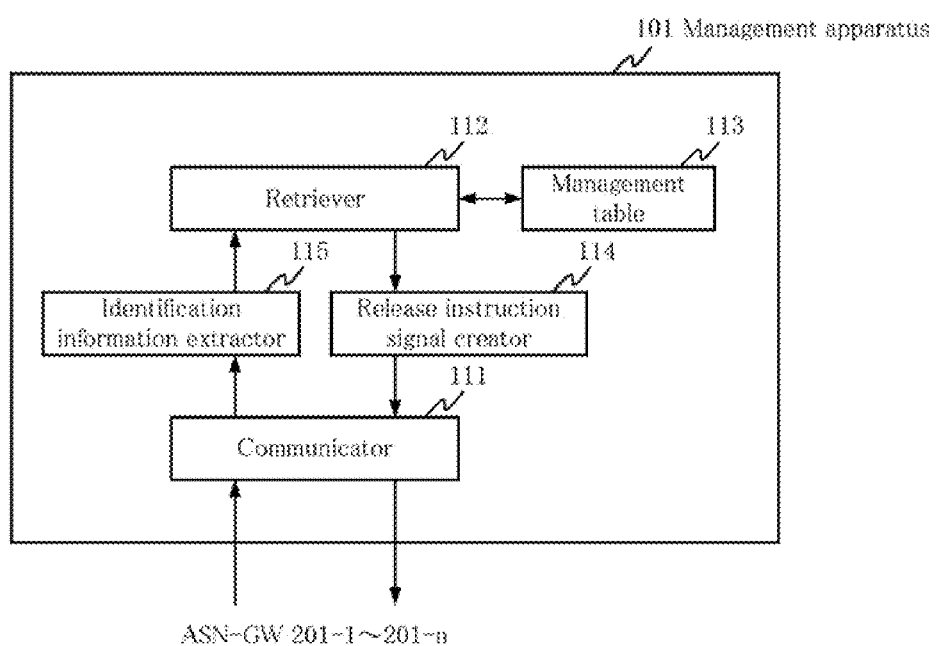
FIG. 6 is a diagram showing an example of an internal configuration of a management apparatus shown in FIG. 1.

FIG. 6 is a diagram showing an example of an internal configuration of management apparatus 101 shown in FIG. 1.

As shown in FIG. 6, management apparatus 101 shown in FIG. 1 includes communicator 111, retriever 112, management table 113, release instruction signal creator 114, and identification information extractor 115.

Communicator 111 is a first communicator which performs communication to ASN-GWs 201-1 to 201-*n* shown in FIG. 1.

Identification information extractor 115 extracts ASN-GW identification information uniquely attached to each ASN-GW 201-1 to 201-*n* from a failure occurrence signal transmitted from ASN-GWs 201-1 to 201-*n* and received by communicator 111. Identification information extractor 115 outputs the extracted ASN-GW identification information to retriever 112.

Based on ASN-GW identification information outputted from identification information extractor 115, retriever 112 retrieves an MS on which the ASN-GW, at which the failure had occurred, is performing processing as well as ASN-GWs performing other processing on the MS.

Management table 113 stores processing association information that associates MS identification information uniquely attached to each MS 401-1 to 401-3 with ASN-GW identification information uniquely attached to each ASN-GW 201-1 to 201-*n* which processes MS 401-1 to 401-3.

The processing association information is information created based on MS management information stored in management tables 215 of ASN-GWs 201-1 to 201-*n*.

Upon activation of management apparatus 101, the MS management information is read from ASN-GWs 201-1 to 201-*n* by management apparatus 101, whereby processing association information is created based on the read MS management information and stored in management table 113.

FIG. 7 is a diagram showing an example of processing association information stored in management table 113 shown in FIG. 6.

As shown in FIG. 7, management table 113 shown in FIG. 6 stores, in association with each other, MS identification information, identification information of Anchor ASN-GWs performing the Anchor function which serves as a data path enabling the MSs to communicate, identification information of Serving ASN-GWs performing the Serving function for managing information on the MSs, and identification information of Authenticator ASN-GWs performing the Authenticator function for authenticating the MSs.

For example, MS identification information MS 401-1, Anchor ASN-GW identification information ASN-GW 201-1, Serving ASN-GW identification information ASN-GW 201-2, and Authenticator ASN-GW identification information ASN-GW 201-3 are stored in association with each other. This indicates that with respect to MS 401-1, ASN-GW 201-1 performs the Anchor function, ASN-GW 201-2 performs the Serving function, and ASN-GW 201-3 performs the Authenticator function. In addition, MS identification information MS 401-2, Anchor ASN-GW identification information ASN-GW 201-1, Serving ASN-GW identification information ASN-GW 201-1, and Authenticator ASN-GW identification information ASN-GW 201-1 are stored in association with each other. This indicates that with respect to MS 401-2, ASN-GW 201-1 performs the Anchor function, the Serving function and the Authenticator function. Furthermore, MS identification information MS 401-3, Anchor ASN-GW identification information ASN-GW 201-1, Serving ASN-GW identification information ASN-GW 201-2, and Authenticator ASN-GW identification information ASN-GW 201-2 are stored in association with each other. This indicates that with respect to MS 401-3, ASN-GW 201-1 performs the Anchor function while ASN-GW 201-2 performs the Serving function and the Authenticator function.

The processing association information may be arranged to be changed after storage during the aforementioned activation in response to MS management information possessed by ASN-GWs 201-1 to 201-*n* being read (acquired) from management apparatus 101 at preset intervals. The processing association information may alternatively be arranged to be changed at a preset timing upon receiving a notification from ASN-GWs 201-1 to 201-*n* when the functions (roles) respectively performed by ASN-GWs 201-1 to 201-*n* change, such as after a handover (R4 HO) across different ASN-GWs is performed or after reauthentication subsequent to an R4 HO is performed.

Based on a retrieval result of retriever 112, release instruction signal creator 114 creates a release instruction signal indicating relevant ASN-GWs that resources of relevant MSs are to be released, and outputs the created release instruction signal to communicator 111.

A state transition of ASN-GWs 201-1 to 201-*n* which perform the Anchor function, the Serving function and the Authenticator function with respect to a single MS (for example, MS 401-1) will now be described.

Figure 8:
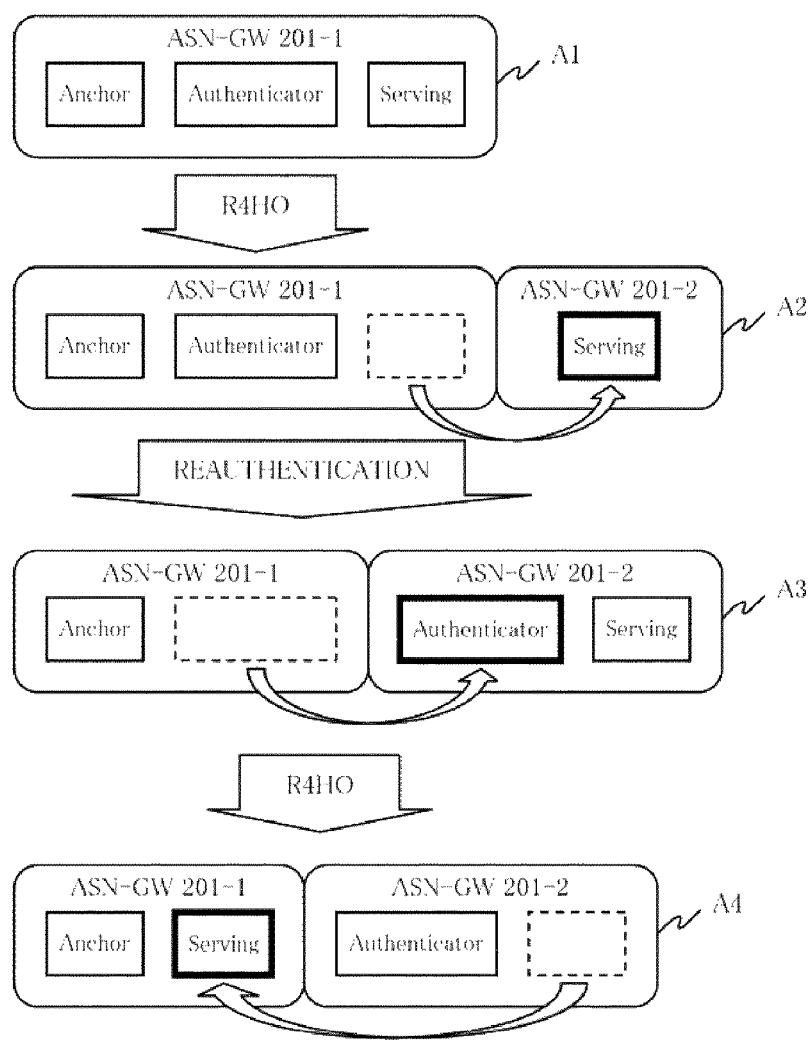
FIG. 8 is a diagram showing a first example of a state transition of an ASN-GW that performs an Anchor function, a Serving function and an Authentication function with respect to a single MS.

FIG. 8 is a diagram showing a first example of a state transition of ASN-GWs 201-1 to 201-*n* that perform the Anchor function, the Serving function and the Authentication function with respect to a single MS.

First, when MS 401-1 exists under ASN-GW 201-1, ASN-GW 201-1 performs the Anchor function, the Serving function and the Authentication function with respect to MS 401-1 (state A1). In other words, in state A1, ASN-GW 201-1 becomes the Anchor ASN-GW, the Serving ASN-GW and the Authentication ASN-GW with respect to MS 401-1.

At this point, when an R4 HO occurs as a result of MS 401-1 moving from under ASN-GW 201-1 to under ASN-GW 201-2, the Serving function with respect to MS 401-1 moves from ASN-GW 201-1 to ASN-GW 201-2 (state A2). In other words, in state A2, ASN-GW 201-1 becomes the Anchor ASN-GW and the Authenticator ASN-GW with respect to MS 401-1. In addition, ASN-GW 201-2 becomes the Serving ASN-GW.

Next, after reauthentication of MS 401-1 is performed, the Authenticator function with respect to MS 401-1 moves from ASN-GW 201-1 to ASN-GW 201-2 (state A3). In other words, in state A3, ASN-GW 201-1 becomes the Anchor ASN-GW with respect to MS 401-1. In addition, ASN-GW 201-2 becomes the Authenticator ASN-GW and the Serving ASN-GW.

Subsequently, when a further R4 HO occurs as a result of MS 401-1 moving from under ASN-GW 201-2 to under ASN-GW 201-1, the Serving function with respect to MS 401-1 moves from ASN-GW 201-2 to ASN-GW 201-1 (state A4). In other words, in state A4, ASN-GW 201-1 becomes the Anchor ASN-GW and the Serving ASN-GW with respect to MS 401-1. In addition, ASN-GW 201-2 becomes the Authenticator ASN-GW.

Figure 9:
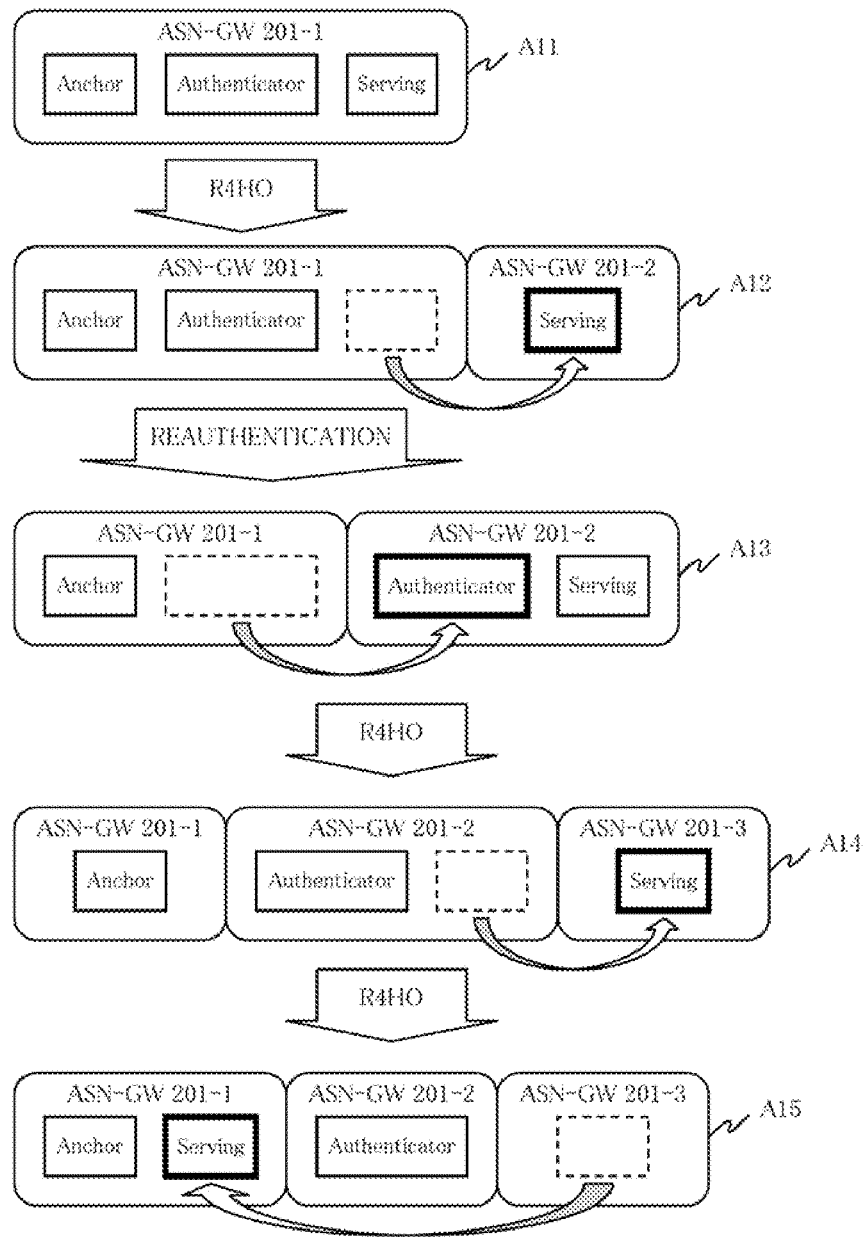
FIG. 9 is a diagram showing a second example of a state transition of an ASN-GW that performs an Anchor function, a Serving function and an Authentication function with respect to a single MS.

FIG. 9 is a diagram showing a second example of a state transition of ASN-GWs 201-1 to 201-*n* that perform the Anchor function, the Serving function and the Authentication function with respect to a single MS.

First, when MS 401-1 exists under ASN-GW 201-1, ASN-GW 201-1 performs the Anchor function, the Serving function and the Authentication function with respect to MS 401-1 (state A11). In other words, in state A11, ASN-GW 201-1 becomes the Anchor ASN-GW, the Serving ASN-GW and the Authentication ASN-GW with respect to MS 401-1.

At this point, when an R4 HO occurs as a result of MS 401-1 moving from under ASN-GW 201-1 to under ASN-GW 201-2, the Serving function with respect to MS 401-1 moves from ASN-GW 201-1 to ASN-GW 201-2 (state A12). In other words, in state A12, ASN-GW 201-1 becomes the Anchor ASN-GW and the Authenticator ASN-GW with respect to MS 401-1. In addition, ASN-GW 201-2 becomes the Serving ASN-GW.

Next, after reauthentication of MS 401-1 is performed, the Authenticator function with respect to MS 401-1 moves from ASN-GW 201-1 to ASN-GW 201-2 (state A13). In other words, in state A13, ASN-GW 201-1 becomes the Anchor ASN-GW with respect to MS 401-1. In addition, ASN-GW 201-2 becomes the Authenticator ASN-GW and the Serving ASN-GW.

Subsequently, when an R4 HO occurs as a result of MS 401-1 moving from under ASN-GW 201-2 to under ASN-GW 201-3, the Serving function with respect to MS 401-1 moves from ASN-GW 201-2 to ASN-GW 201-3 (state A14). In other words, in state A14, ASN-GW 201-1 becomes the Anchor ASN-GW with respect to MS 401-1. In addition, ASN-GW 201-2 becomes the Authenticator ASN-GW. Moreover, ASN-GW 201-3 becomes the Serving ASN-GW.

Furthermore, when an R4 HO occurs as a result of MS 401-1 moving from under ASN-GW 201-3 to under ASN-GW 201-1, the Serving function with respect to MS 401-1 moves from ASN-GW 201-3 to ASN-GW 201-1 (state A15). In other words, in state A15, ASN-GW 201-1 becomes the Anchor ASN-GW and the Serving ASN-GW with respect to MS 401-1. In addition, ASN-GW 201-2 becomes the Authenticator ASN-GW.

Figure 10:
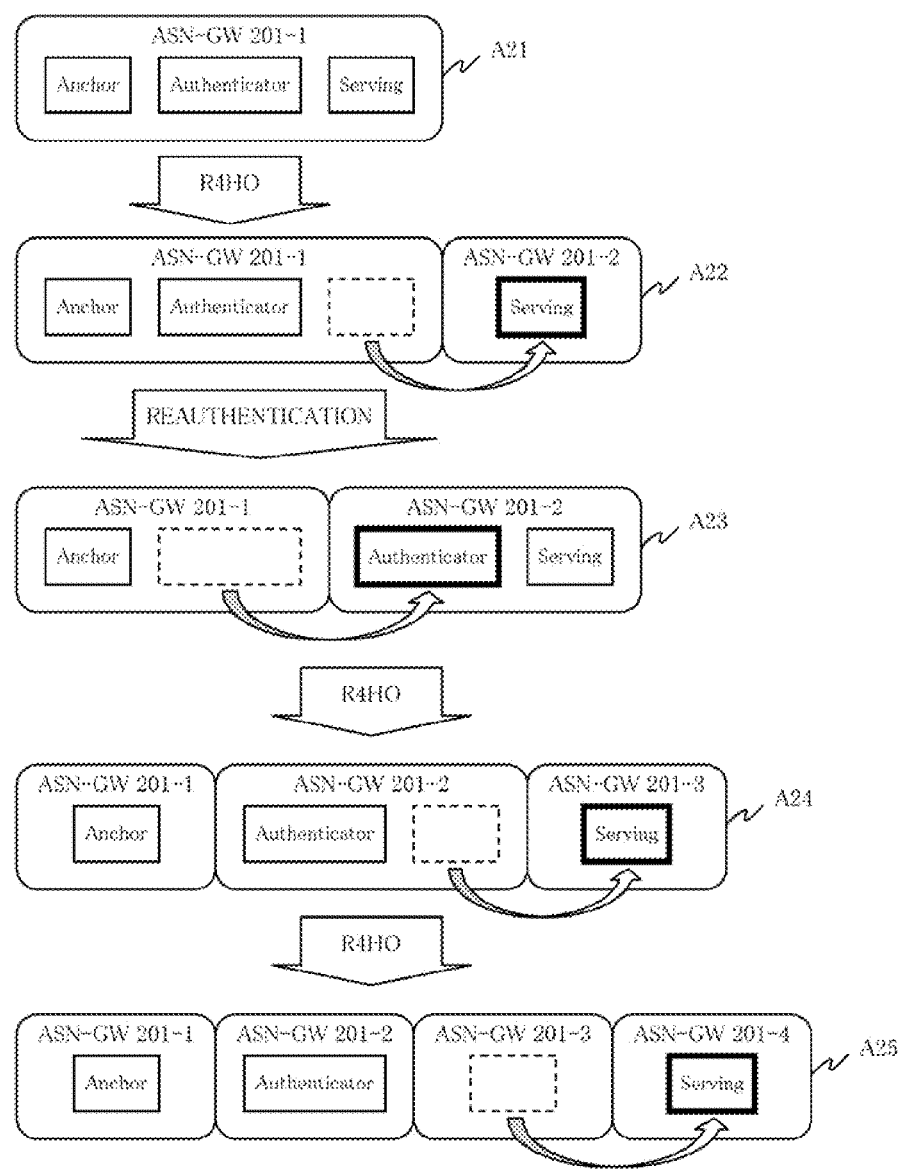
FIG. 10 is a diagram showing a third example of a state transition of an ASN-GW that performs an Anchor function, a Serving function and an Authentication function with respect to a single MS.

FIG. 10 is a diagram showing a third example of a state transition of ASN-GWs 201-1 to 201-*n* that perform the Anchor function, the Serving function and the Authentication function with respect to a single MS.

First, when MS 401-1 exists under ASN-GW 201-1, ASN-GW 201-1 performs the Anchor function, the Serving function and the Authentication function with respect to MS 401-1 (state A21). In other words, in state A21, ASN-GW 201-1 becomes the Anchor ASN-GW, the Serving ASN-GW and the Authentication ASN-GW with respect to MS 401-1.

At this point, when an R4 HO occurs as a result of MS 401-1 moving from under ASN-GW 201-1 to under ASN-GW 201-2, the Serving function with respect to MS 401-1 moves from ASN-GW 201-1 to ASN-GW 201-2 (state A22). In other words, in state A22, ASN-GW 201-1 becomes the Anchor ASN-GW and the Authenticator ASN-GW with respect to MS 401-1. In addition, ASN-GW 201-2 becomes the Serving ASN-GW.

Next, after reauthentication of MS 401-1 is performed, the Authenticator function with respect to MS 401-1 moves from ASN-GW 201-1 to ASN-GW 201-2 (state A23). In other words, in state A23, ASN-GW 201-1 becomes the Anchor ASN-GW with respect to MS 401-1. In addition, ASN-GW 201-2 becomes the Authenticator ASN-GW and the Serving ASN-GW.

Subsequently, when an R4 HO occurs as a result of MS 401-1 moving from under ASN-GW 201-2 to under ASN-GW 201-3, the Serving function with respect to MS 401-1 moves from ASN-GW 201-2 to ASN-GW 201-3 (state A24). In other words, in state A24, ASN-GW 201-1 becomes the Anchor ASN-GW with respect to MS 401-1. In addition, ASN-GW 201-2 becomes the Authenticator ASN-GW. Moreover, ASN-GW 201-3 becomes the Serving ASN-GW.

Furthermore, when an R4 HO occurs as a result of MS 401-1 moving from under ASN-GW 201-3 to under ASN-GW 201-4, the Serving function with respect to MS 401-1 moves from ASN-GW 201-3 to ASN-GW 201-4 (state A25). In other words, in state A25, ASN-GW 201-1 becomes the Anchor ASN-GW with respect to MS 401-1. In addition, ASN-GW 201-2 becomes the Authenticator ASN-GW. Moreover, ASN-GW 201-4 becomes the Serving ASN-GW.

Figure 11:
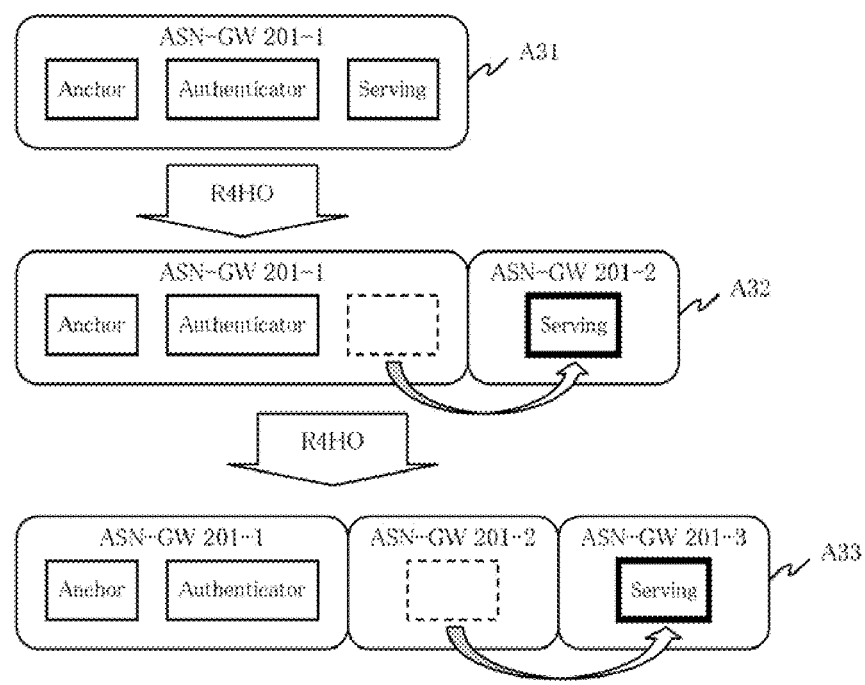
FIG. 11 is a diagram showing a fourth example of a state transition of an ASN-GW that performs an Anchor function, a Serving function and an Authentication function with respect to a single MS.

FIG. 11 is a diagram showing a fourth example of a state transition of ASN-GWs 201-1 to 201-*n* that perform the Anchor function, the Serving function and the Authentication function with respect to a single MS.

First, when MS 401-1 exists under ASN-GW 201-1, ASN-GW 201-1 performs the Anchor function, the Serving function and the Authentication function with respect to MS 401-1 (state A31). In other words, in state A31, ASN-GW 201-1 becomes the Anchor ASN-GW, the Serving ASN-GW and the Authentication ASN-GW with respect to MS 401-1.

At this point, when an R4 HO occurs as a result of MS 401-1 moving from under ASN-GW 201-1 to under ASN-GW 201-2, the Serving function with respect to MS 401-1 moves from ASN-GW 201-1 to ASN-GW 201-2 (state A32). In other words, in state A32, ASN-GW 201-1 becomes the Anchor ASN-GW and the Authenticator ASN-GW with respect to MS 401-1. In addition, ASN-GW 201-2 becomes the Serving ASN-GW.

Subsequently, when a further R4 HO occurs as a result of MS 401-1 moving from under ASN-GW 201-2 to under ASN-GW 201-3, the Serving function with respect to MS 401-1 moves from ASN-GW 201-2 to ASN-GW 201-3 (state A33). In other words, in state A33, ASN-GW 201-1 becomes the Anchor ASN-GW and the Authenticator ASN-GW with respect to MS 401-1. Moreover, ASN-GW 201-3 becomes the Serving ASN-GW.

As described above, the logically-divided Anchor ASN-GW, Serving ASN-GW and Authenticator ASN-GW are distributed to physically different ASN-GWs in accordance with R4 HOs and reauthentications which occur due to movement of MS 401-1.

Failure occurrence notification processing by ASN-GWs 201-1 to 201-*n* shown in FIG. 1 will now be described. For now, failure occurrence notification processing by ASN-GW 201-1 will be described as an example.

Figure 12:
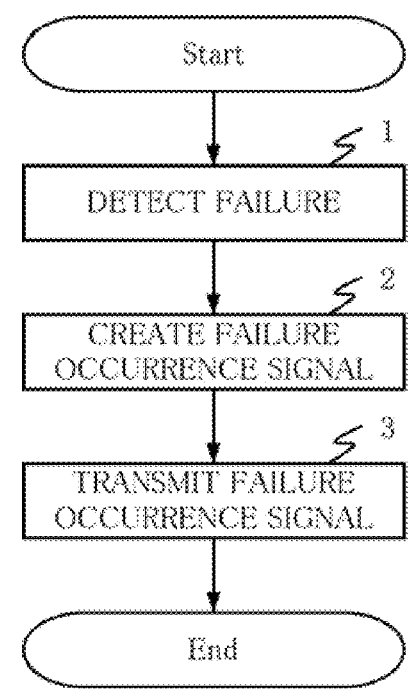
FIG. 12 is a flowchart describing an example of failure occurrence notification processing by the ASN-GW shown in FIG. 1.

FIG. 12 is a flowchart describing an example of failure occurrence notification processing by ASN-GW 201-1 shown in FIG. 1.

First, when failure detector 212 detects that a failure (service suspension) in which services cannot be provided has occurred at service provider 211 in step 1, an output to that effect is made from failure detector 212 to failure occurrence signal creator 213.

Failure occurrence signal creator 213 then creates a failure occurrence signal indicating that a failure has occurred at service provider 211 in step 2. At this point, the failure occurrence signal includes ASN-GW identification information of ASN-GW 201-1.

The created failure occurrence signal is transmitted from failure occurrence signal creator 213 to management apparatus 101 via communicator 214 in step 3.

A management method of ASN-GWs 201-1 to 201-n used by management apparatus 101 shown in FIG. 1 will now be described.

Figure 13:
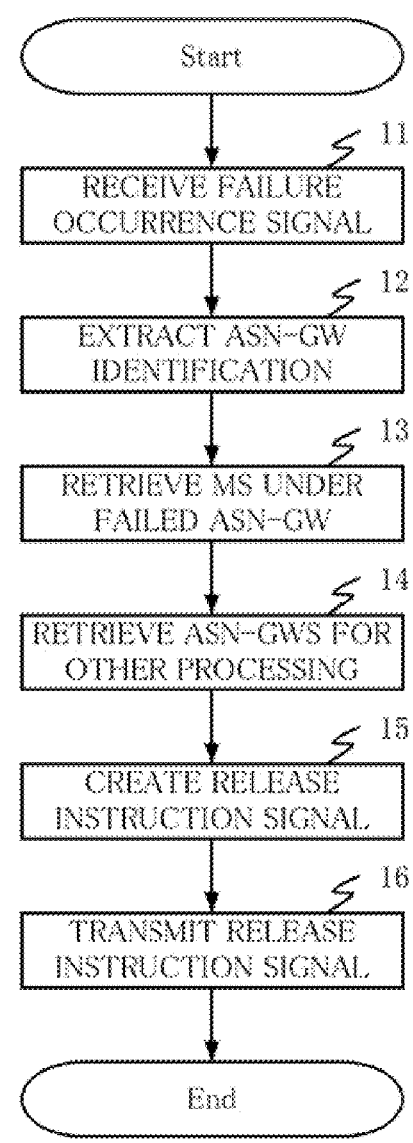
FIG. 13 is a flowchart describing an example of an ASN-GW management method used by the management apparatus shown in FIG. 1.

FIG. 13 is a flowchart describing an example of a management method of ASN-GWs 201-1 to 201-n used by management apparatus 101 shown in FIG. 1. For now, a case where a failure has occurred at ASN-GW 201-2 will be described as an example. Moreover, a failure occurrence signal for notifying that a failure has occurred at ASN-GWs 201-1 to 201-n include identification information of ASN-GWs 201-1 to 201-n as notification sources.

First, when a failure occurrence signal is received at communicator 111 of management apparatus 101 in step 11, the received failure occurrence signal is outputted to identification information extractor 115.

At identification information extractor 115, identification information of ASN-GW 201-2 is extracted from the failure occurrence signal in step 12. The extracted identification information of ASN-GW 201-2 is outputted from identification information extractor 115 to retriever 112.

Next, at retriever 112, based on the identification information of ASN-GW 201-2, an MS (MS identification information) under ASN-GW 201-2 is retrieved from management table 113 in step 13.

In the case of management table 113 shown in FIG. 7, since the MSs under ASN-GW 201-2 are MS 401-1 and MS 401-3, MS 401-1 and MS 402-3 are retrieved.

In addition, a ASN-GW processing retrieved MS 401-1 or 401-3 is retrieved in step 14. In the case of management table 113 shown in FIG. 7, ASN-GW 201-1 and ASN-GW 201-3 are retrieved.

Subsequently, a release instruction signal instructing retrieved ASN-GW 201-1 and ASN-GW 201-3 to release resources secured in order to process MS 401-1 and MS 401-3 is created by release instruction signal creator 114 in step 15. The release instruction signal need only include information on a transmission destination (retrieved ASN-GW 201-1 and ASN-GW 201-3), MS identification information of MSs as targets of resource release (MS 401-1 and MS 401-3), and information instructing the release of secured resources, and a specific signal format thereof will not be stipulated herein.

After the release instruction signal is created by release instruction signal creator 114, the created release instruction signal is transmitted from communicator 111 to ASN-GW 201-1 and ASN-GW 201-3 as transmission destinations in step 16.

Resource release processing by ASN-GW 201-1 and ASN-GW 201-3 to which the release instruction signal was transmitted in step 16 will now be described. For now, resource release processing by ASN-GW 201-1 will be described as an example.

Figure 14:
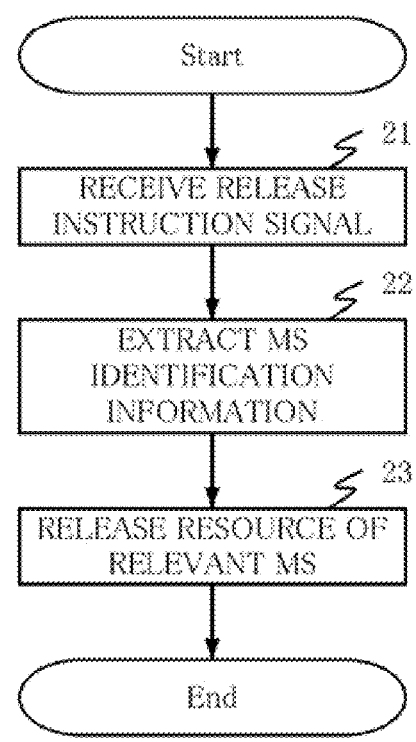
FIG. 14 is a flowchart describing an example of resource release processing by an ASN-GW shown in FIG. 1.

FIG. 14 is a flowchart describing an example of resource release processing by ASN-GW 201-1 shown in FIG. 1.

When the resource release signal transmitted from management apparatus 101 is received by communicator 214 of ASN-GW 201-1 in step 21, MS identification information is extracted from the received release instruction signal at management table updater 216 in step 22. In this case, the resource release signal transmitted from management apparatus 101 includes MS 401-1 and MS 401-3 as MS identification information.

Consequently, the resources of MSs corresponding to the extracted MS identification information are released by resource manager 217 in step 23. In this case, the resources of MS 401-1 and MS 401-3 are released. Furthermore, MS management information corresponding to MS 401-1 and MS 401-3 is deleted from management table 215 by management table updater 216.

Alternatively, whether or not a failure has occurred at ASN-GWs 201-1 to 201-n may be recognized using periodic monitoring (polling or the like) from management apparatus 101.

Figure 15:
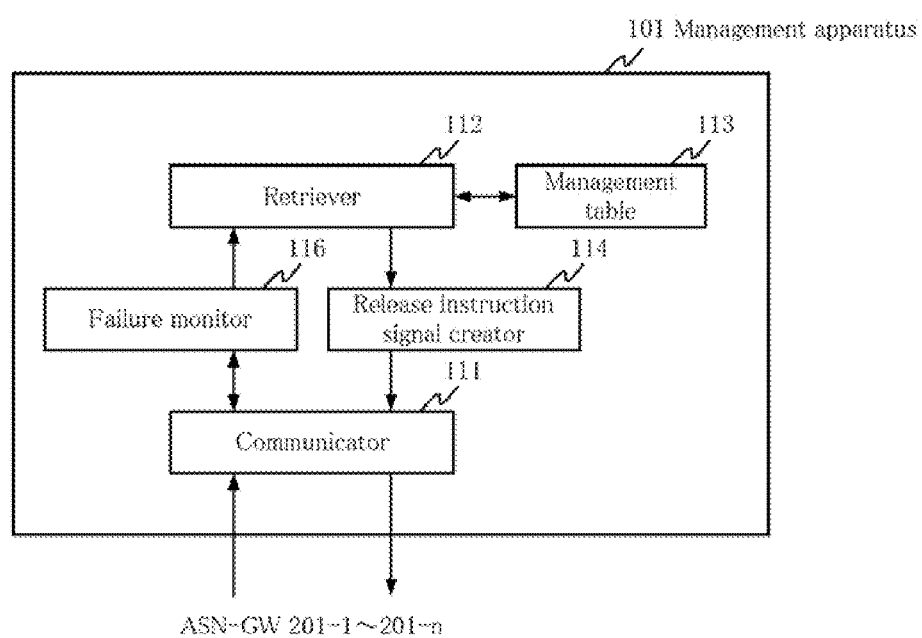
FIG. 15 is a diagram showing another example of an internal configuration of the management apparatus shown in FIG. 1.

FIG. 15 is a diagram showing another example of an internal configuration of management apparatus 101 shown in FIG. 1.

As shown in FIG. 15, management apparatus 101 shown in FIG. 1 includes communicator 111, retriever 112, management table 113, release instruction signal creator 114, and failure monitor 116. "Identification information extractor 115" of the internal configuration example of management apparatus 101 shown in FIG. 6 has been replaced with "failure monitor 116".

Failure monitor 116 periodically monitors whether or not a failure has occurred at ASN-GWs 201-1 to 201-n. As for a monitoring method thereof, a method generally used for monitoring opposing apparatuses shall suffice, such as a method involving monitoring a predetermined register (bit) provided at ASN-GWs 201-1 to 201-n or a method based on request/response signals. Subsequently, based on the monitoring result, ASN-GW identification information of ASN-GWs 201-1 to 201-n at which an occurrence of a failure was recognized is outputted to retriever 112.

Based on ASN-GW identification information outputted from failure monitor 116, retriever 112 retrieves from management table 113 an MS on which the ASN-GW, at which the failure had occurred, is performing processing as well as ASN-GWs performing other processing on the MS.

Operations of other components are the same as those of the depicted internal configuration example of management apparatus 101.

Figure 16:
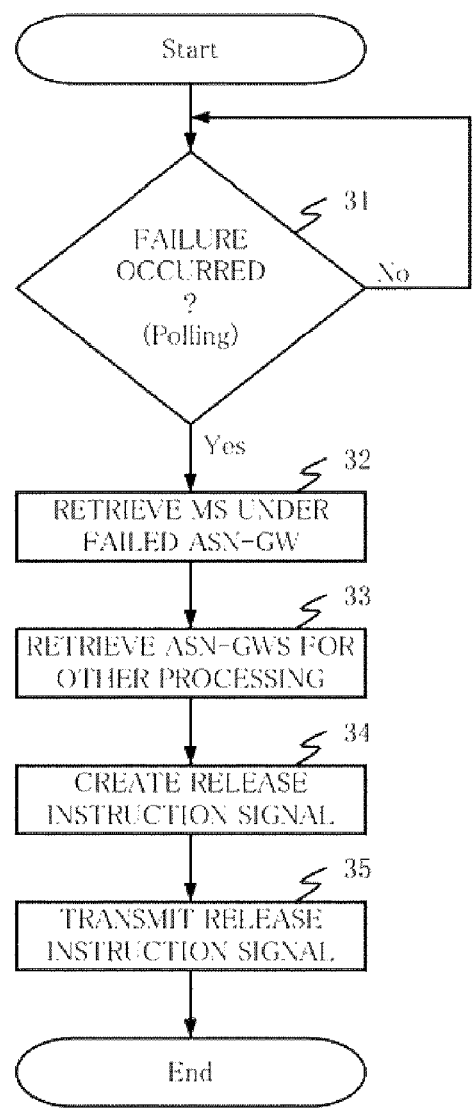
FIG. 16 is a flowchart describing another example of an ASN-GW management method used by the management apparatus shown in FIG. 1.

FIG. 16 is a flowchart describing an example of another management method of ASN-GWs 201-1 to 201-n used by management apparatus 101 shown in FIG. 1. In this case, the internal configuration of management apparatus 101 is as shown in FIG. 15. In addition, similar to the example described above, a case where a failure has occurred at ASN-GW 201-2 will be described as an example.

Failure monitor 116 of management apparatus 101 monitors failures of ASN-GWs 201-1 to 201-n (whether or not ASN-GWs 201-1 to 201-n are in a service suspended state) via communicator 111. For example, failure monitoring signals are respectively transmitted from failure monitor 116 to ASN-GWs 201-1 to 201-n via communicator 111 at regular intervals, whereby whether or not a failure has occurred at ASN-GWs 201-1 to 201-n is recognized based on whether or not a response to the failure monitoring signals are transmitted from ASN-GWs 201-1 to 201-n in step 31. As for a failure monitoring method thereof, a method generally used for periodically monitoring opposing (connected) apparatuses, such as polling, shall suffice.

In step 31, when failure monitor 116 recognizes that a failure has occurred at ASN-GW 201-2, identification information of the recognized ASN-GW 201-2 is outputted from failure monitor 116 to retriever 112.

At retriever 112, based on the identification information of ASN-GW 201-2, an MS (MS identification information) under ASN-GW 201-2 is retrieved from management table 113 in step 32.

In the case of management table 113 shown in FIG. 7, since the MSs under ASN-GW 201-2 are MS 401-1 and MS 401-3, MS 401-1 and MS 402-3 are retrieved.

In addition, a ASN-GW processing the retrieved MS 401-1 or 401-3 is retrieved in step 33. In the case of management table 113 shown in FIG. 7, ASN-GW 201-1 and ASN-GW 201-3 are retrieved.

Subsequently, a release instruction signal instructing retrieved ASN-GW 201-1 and ASN-GW 201-3 to release resources secured in order to process MS 401-1 and MS 401-3 is created by release instruction signal creator 114 in step 34. The release instruction signal need only include information on a transmission destination (retrieved ASN-GW 201-1 and ASN-GW 201-3), MS identification information of MSs as targets of resource release (MS 401-1 and MS 401-3), and information instructing the release of secured resources, and a specific signal format thereof will not be stipulated herein.

After the release instruction signal is created by release instruction signal creator 114, the created release instruction signal is transmitted from communicator 111 to ASN-GW 201-1 and ASN-GW 201-3 as transmission destinations in step 35.

The processing by management apparatus 101 described above may be arranged to be performed by a logical circuit fabricated in accordance with the intended use. In addition, a program describing processing contents as procedures may be stored in a readable storage medium by management apparatus 101, whereby the program stored in the storage medium is executed by having management apparatus 101 read the program. A storage medium readable by management apparatus 101 includes a relocatable storage medium such as a floppy disk (registered trademark), a magnet-optical disk, a DVD or a CD, a memory such as a ROM or a RAM built into management apparatus 101, an HDD, or the like. The program stored in the storage medium is read by a CPU (not shown) in management apparatus 101, whereby processing similar to that described above is performed under the control of the CPU. In this case, the CPU operates as a computer that executes the program read from a storage medium storing the program.

As described above, when an MS receiving services from an ASN-GW is no longer able to receive the services due to an occurrence of a failure at the ASN-GW, the resources of the MS inside ASN-GWs other than the ASN-GW and which provide other services to the MS is released. Consequently, unnecessarily secured resources can be released and the risk of hardware resource depletion can be reduced. In addition, consistency in management information in the respective ASN-GWs can be ensured during re-entry of an MS into a WiMAX network.

The present invention has been described above with reference to the exemplary embodiment. However, the present invention is not limited to the above exemplary embodiment. Various modifications that those skilled in the art can understand may be made within the scope of the present invention to the configuration and details of the present invention.

The invention claimed is:

1. A communication system comprising a plurality of service providing apparatuses providing a plurality of services via a wireless base station to a mobile communication terminal provided with a wireless communication function and a management apparatus connected to the plurality of service providing apparatuses, wherein the management apparatus detects whether or not any of the plurality of service providing apparatuses are in a service suspended state, and instructs service providing apparatuses other than a service providing apparatus having entered the service suspended state to release resources of the mobile communication terminal to which services have been provided by the service providing apparatus having entered the service suspended state, wherein the management apparatus comprises:

a management table that stores processing association information in which MS identification information uniquely attached to the mobile communication terminal is associated with ASN-GW identification information uniquely attached to service providing apparatuses respectively providing services to the mobile communication terminal;

a failure monitor that monitors whether or not the service providing apparatuses are in a service suspended state;

a retriever that retrieves, based on ASN-GW identification information attached to a service providing apparatus recognized by the failure monitor to be in a service suspended state, MS identification information associated with the ASN-GW identification information from the management table, and retrieves, based on retrieved MS identification information, ASN-GW identification information attached to service providing apparatuses providing the mobile communication terminal with services other than said services from the management table;

a release instruction signal creator that creates a release instruction signal that is an instruction for releasing resources of the mobile communication terminal to which the retrieved MS identification information is attached; and a first communicator that transmits the release instruction signal to the service providing apparatus to which the retrieved ASN-GW identification information is attached, the service providing apparatus comprising:

a resource manager that releases, upon receiving the release instruction signal, resources of the mobile communication terminal instructed by the release instruction signal.

2. The communication system according to claim 1, wherein the service providing apparatus comprises:

a service provider providing the services;

a failure detector that detects that the service provider has entered a service suspended state;

a failure occurrence signal creator that creates, when a transition to a service suspended state is detected by the failure detector, a failure occurrence signal including ASN-GW identification information attached to said service providing apparatus and which indicates that the failure has occurred; and a second communicator that transmits the failure occurrence signal to the management apparatus, the management apparatus comprises:

an identification information extractor that extracts the ASN-GW identification information from the failure occurrence signal transmitted from the service providing apparatus, and the retriever retrieves, based on the extracted ASN-GW identification information, MS identification information associated with the ASN-GW identification information from the management table, and retrieves, based on retrieved MS identification information, ASN-GW identification information attached to service providing apparatuses providing the mobile communication terminal with services other than said services from the management table.

3. The communication system according to claim 2, wherein
the service provider provides the mobile communication terminal with a service to become a data path for the mobile communication terminal to communicate, a service for managing information of the mobile communication terminal, and a service for performing authentication processing of the mobile communication terminal.

4. The communication system according to claim 1, wherein
the management apparatus acquires MS management information, which is managed by the service providing apparatus and which associates MS identification information attached to a mobile communication terminal to which said service providing apparatus is providing services with ASN-GW identification information attached to the service providing apparatuses respectively providing services to the mobile communication terminal, from the service providing apparatus at a predetermined timing, creates the processing association information based on the MS management information, and stores the processing association information in the management table.

5. The communication system according to claim 1, wherein
the service providing apparatus transmits MS management information, which is managed by said service providing apparatus and which associates MS identification information attached to a mobile communication terminal to which said service providing apparatus is providing services with ASN-GW identification information attached to the service providing apparatuses respectively providing services to the mobile communication terminal, to the management apparatus at a predetermined timing, and
the management apparatus creates the processing association information based on the MS management information transmitted from the service providing apparatus and stores the processing association information in the management table.

6. A management apparatus that manages a plurality of service providing apparatuses providing a plurality of services via a wireless base station to a mobile communication terminal provided with a wireless communication function, wherein
the management apparatus detects whether or not any of the plurality of service providing apparatuses are in a service suspended state, and instructs service providing apparatuses other than a service providing apparatus having entered the service suspended state to release resources of the mobile communication terminal to which services have been provided by the service providing apparatus having entered the service suspended state, comprising:
a management table that stores processing association information in which MS identification information uniquely attached to the mobile communication terminal is associated with ASN-GW identification information uniquely attached to service providing apparatuses respectively providing services to the mobile communication terminal;
a failure monitor that monitors whether or not the service providing apparatuses are in a service suspended state;
a retriever that retrieves, based on ASN-GW identification information attached to a service providing apparatus recognized by the failure monitor to be in a service suspended state, MS identification information associated with the ASN-GW identification information from the management table, and retrieves, based on retrieved MS identification information, ASN-GW identification information attached to service providing apparatuses providing the mobile communication terminal with services other than said services from the management table;
a release instruction signal creator that creates a release instruction signal that is an instruction for releasing resources of the mobile communication terminal to which the retrieved MS identification information is attached; and
a communicator that transmits the release instruction signal to the service providing apparatus to which the retrieved ASN-GW identification information is attached.

7. The management apparatus according to claim 6, comprising:
an identification information extractor that extracts, when a failure occurrence signal including ASN-GW identification information attached to the service providing apparatus is transmitted from said service providing apparatus, the ASN-GW identification information from the failure occurrence signal, wherein
the retriever retrieves, based on the extracted ASN-GW identification information, MS identification information associated with the ASN-GW identification information from the management table, and retrieves, based on retrieved MS identification information, ASN-GW identification information attached to service providing apparatuses providing the mobile communication terminal with services other than said services from the management table.

8. The management apparatus according to claim 6, wherein
the management apparatus acquires MS management information, which is managed by the service providing apparatus and which associates MS identification information attached to a mobile communication terminal to which said service providing apparatus is providing services with ASN-GW identification information attached to the service providing apparatuses respectively providing services to the mobile communication terminal, from the service providing apparatus at a predetermined timing, creates the processing association information based on the MS management information, and stores the processing association information in the management table.

9. A management method for managing a plurality of service providing apparatuses providing a plurality of services via a wireless base station to a mobile communication terminal provided with a wireless communication function, the management method comprising steps for:
detecting whether or not any of the plurality of service providing apparatuses are in a service suspended state; and instructing service providing apparatuses other than a service providing apparatus having entered the service suspended state to release resources of the mobile communication terminal to which services have been provided by the service providing apparatus having entered the service suspended state, comprising steps for:

storing processing association information, in which MS identification information uniquely attached to the mobile communication terminal is associated with ASN-GW identification information uniquely attached to service providing apparatuses respectively providing services to the mobile communication terminal, in a management table;

monitoring whether or not the service providing apparatuses are in a service suspended state;

retrieving, based on ASN-GW identification information attached to a service providing apparatus recognized to be in a service suspended state, MS identification information associated with the ASN-GW identification information from the management table;

retrieving, based on retrieved MS identification information, ASN-GW identification information attached to service providing apparatuses providing the mobile communication terminal with services other than said services from the management table;

creating a release instruction signal that is an instruction for releasing resources of the mobile communication terminal to which the retrieved MS identification information is attached; and transmitting the release instruction signal to the service providing apparatus to which the retrieved ASN-GW identification information is attached.

10. The management method according to claim 9, comprising steps for:

extracting, when a failure occurrence signal including ASN-GW identification information attached to the service providing apparatus is transmitted from said service providing apparatus, the ASN-GW identification information from the failure occurrence signal;

retrieving, based on the extracted ASN-GW identification information, MS identification information associated with the ASN-GW identification information from the management table; and retrieving, based on retrieved MS identification information, ASN-GW identification information attached to service providing apparatuses providing the mobile communication terminal with services other than said services from the management table.

11. The management method according to claim 9, comprising steps for:

acquiring MS management information, which is managed by the service providing apparatus and which associates MS identification information attached to a mobile communication terminal to which said service providing apparatus is providing services with ASN-GW identification information attached to the service providing apparatuses respectively providing services to the mobile communication terminal, from the service providing apparatus at a predetermined timing;

creating the processing association information based on the MS management information, and;

storing the processing association information in the management table.

* * * * *